United States Patent [19]

Kabasawa et al.

[11] 4,111,660
[45] Sep. 5, 1978

[54] LIQUID-LIQUID EXTRACTION METHOD AND APPARATUS

[76] Inventors: Yozo Kabasawa, 1-2-13, Minami-cho, Kokubunji-shi; Takenori Tanimura, 1-8-11, Matsunoki, Suginami-ku, Tokyo, both of Japan

[21] Appl. No.: 705,877

[22] Filed: Jul. 16, 1976

[51] Int. Cl.² .................. B01D 11/00; B01D 3/00
[52] U.S. Cl. ........................................ 423/8; 210/21; 422/258; 423/24; 423/89; 423/99; 423/658.5; 260/112 R
[58] Field of Search ........... 210/21; 23/267 R, 267 D, 23/267 E, 267 F, 270 R, 270.5 R, 269, 511, 252; 423/658.5

[56] References Cited

U.S. PATENT DOCUMENTS

| | | | |
|---|---|---|---|
| 2,765,298 | 10/1956 | Signer | 23/269 X |
| 3,390,963 | 7/1968 | Wiegandt | 23/270.5 R |
| 3,443,909 | 5/1969 | Goossens | 23/269 X |
| 3,573,982 | 4/1971 | Silver | 23/269 |
| 3,620,681 | 11/1971 | Wright | 210/252 X |

Primary Examiner—Charles N. Hart
Assistant Examiner—E. Rollins Cross
Attorney, Agent, or Firm—William J. Daniel

[57] ABSTRACT

A liquid-liquid extraction method and apparatus using an elongated extraction column arranged at an angle to the horizontal. The column is divided by means of partitions into a plurality of compartments which are in communication by apertures in such partitions. Each end of the extraction column has an inlet and an outlet, which can preferably be arranged concentrically, for the introduction and discharge of two immiscible liquids of differing densities, the less dense liquid being introduced into the lower inlet and discharged through the upper outlet and vice versa for the more dense liquid. The column during extraction is rotated either about its own axis or a spaced parallel axis. The extracting liquid can be circulated for back-extraction through a similarly arranged column containing a third liquid immiscible with the extraction liquid and of differing density.

6 Claims, 8 Drawing Figures

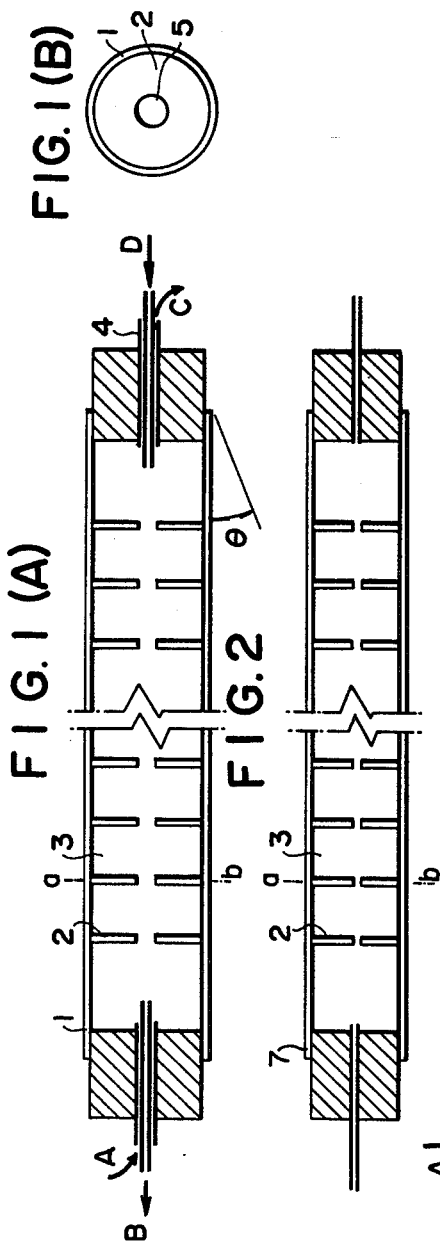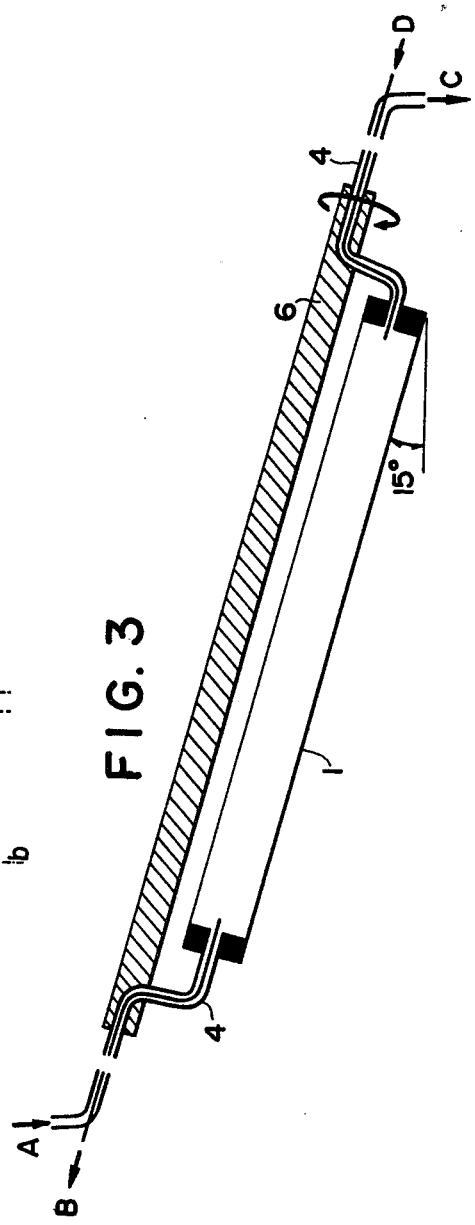

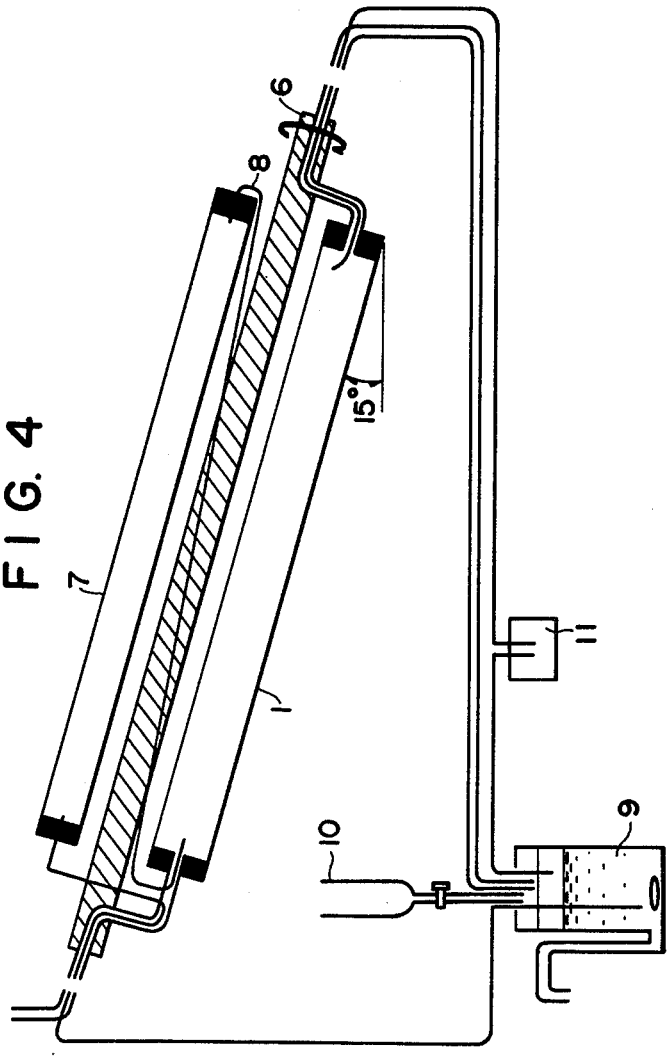

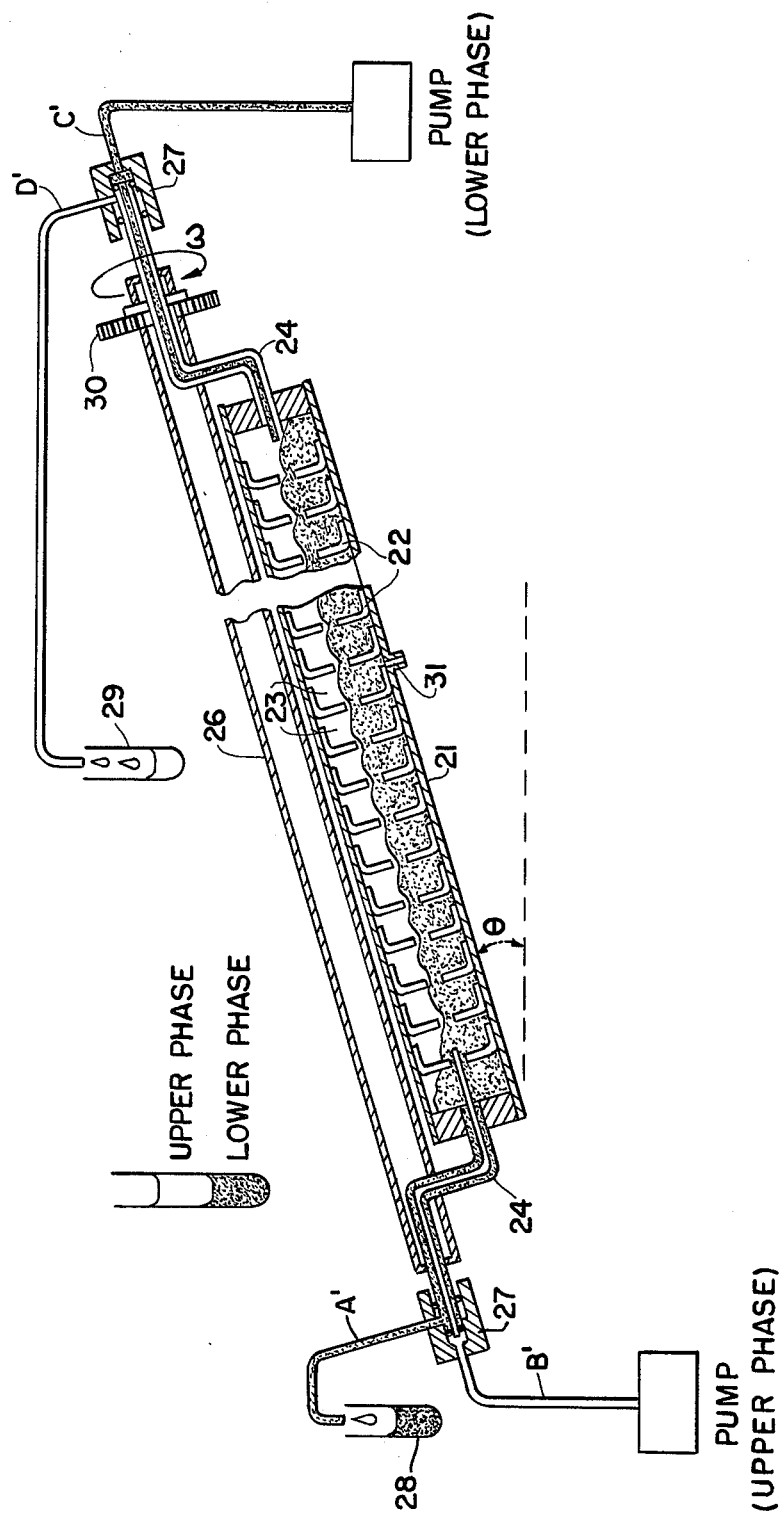

LIQUID-LIQUID EXTRACTION METHOD AND APPARATUS

This invention relates to a new method and apparatus for effecting liquid-liquid extraction, separation and purification. The method and the apparatus of this invention are used for the separation, purification and isolation of various compounds or ions by virtue of the difference in their partitioning characteristics between two immiscible liquid phases.

Many methods are known for this purpose. One famous method, countercurrent distribution, has been well known as a method of isolation which depends on the same principle and has been used for preparative purification on a laboratory scale. One apparatus used for this method is known as the countercurrent distribution train which is based on the idea of accomplishing a large number of extractions with many separating funnels by a machine driven with a motor. Consequently, it is consisted of a line of uniquely shaped distribution tubes connected in series.

This apparatus, however, was subject to a number of drawbacks as follows:

1. It requires a number of fragile, uniquely shaped distribution tubes which have to be connected tightly to prevent leaking, even when the whole train is vigorously shaken by a rocking motion.
2. It requires a mechanical agitator of high power to obtain sufficient rocking motion to achieve effective partitioning of solute between two immiscible liquid phases.
3. After agitation, it requires a long time for the separation of the two phases and in some instances, the two liquid phases form an emulsion which is difficult to separate even after prolonged standing.
4. It requires special devices to transfer the heavier phase.
5. For the effective dispersion of the two phases by rocking, each distribution tube should have adequate empty space. As a result, the size of distribution tubes is much bigger than the total actual volume of the two liquid phases. Furthermore, it is difficult to purify compounds unstable to atmospheric oxygen because of this empty space.

Because countercurrent distribution requires distribution tubes and mechanical shaking of solutions, it cannot be practically adapted to large scale extraction for industrial purposes. Other devices are known, however, for multistage countercurrent extraction for industrial processes. In these apparatus, the original solution of high solute concentration is partitioned with the extracting solution already used for extracting a solution of lower solute concentration and fresh extracting solution is used for extracting solute from the raffinate of lower solute concentration. The process is carried out by countercurrent flow and efficient extraction is accomplished with a relatively small quantity of solvent.

For this kind of large scale countercurrent extraction, a number of devices have been developed, for instance, various kinds of mixer-settlers, spray towers, baffle towers, and so on. In these devices, the extraction is made by the dispersion of fine droplets of one phase into another in the first step and the separation of two phases in the successive step. However, they have many drawbacks as follows:

1. They have many aspects to be improved for efficient partitioning and various types of mixing impellers, punched plates, baffle plates, screens and packing materials have been designed which results in a large and complicated extraction tower.
2. Because the extraction steps consist of dispersion and separation in these towers, space for dispersion and separation must be included in each stage, and the size of the apparatus becomes substantially increased and large space is required.
3. It is preferable for efficient partitioning to make the dispersion with fine droplets; however, this tends to promote emulsion-formation which restricts the application of the apparatus in practice.
4. In the mixer-settler type extractor, high power is required for the efficient stirring.

Another type of apparatus uses centrifugal force for dispersion and separation and is said to be efficient for partitioning between two phases with high viscosity and little difference in density. Podbielniak and Luwesta centrifugal extractors are of this type; however, they are quite complicated just for extraction and require high speeds of rotation which are dangerous and consume large amounts of power.

The method of this invention avoids the drawbacks described above by means of very simple devices and the invention provides an efficient apparatus for extraction, separation and isolation.

The details of construction and the manner of operation of the extraction system of this invention will be more readily understood from the following detailed description when read in conjunction with the accompanying drawings in which:

FIG. 1(A) is a schematic cross-sectional view of one embodiment of extraction column employed in the present invention and FIG. 1(B) is a cross-section taken through such column along line $a-b$ of FIG. 1(A);

FIG. 2 is a schematic view of a supplemental extraction column used in series with the column of FIGS. 1(A) and 1(B) in one embodiment of the invention;

FIG. 3 is a generally diagrammatic view of an extraction apparatus according to the invention utilizing the extraction column of FIGS. 1(A) and (B);

FIG. 4 is a similar schematic view of a modified embodiment of the invention in which the extraction columns of FIGS. 1 and 2 are connected in series;

Figure 5A:
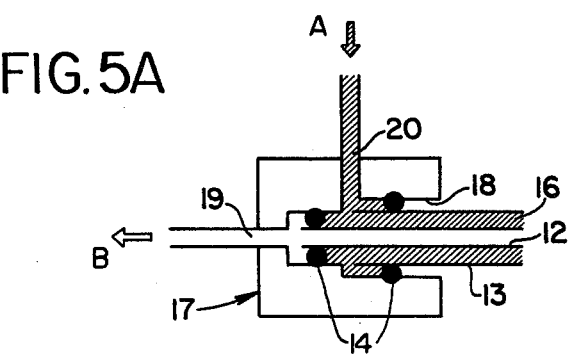
Figure 5B:
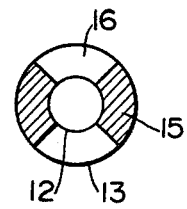

FIG. 5(A) is a diagrammatic view of one arrangement for achieving a rotating seal at the end of a concentric double tubing provided at each end of the extraction column; while FIG. 5(B) illustrates how the tubes of such double tubing can be maintained in spaced apart relation; and FIG. 6 is a more detailed view of an extraction apparatus generally similar to FIG. 3 in which the respective paths of the two phases during the operation of the apparatus are depicted, the dense lower phase being identified with stippling with the light upper phase free of stippling.

One embodiment of the present apparatus is schematically described in FIG. 3. The column 1 has two pairs of inlet and outlet A,C and D,B, respectively. The inlets and outlets of the two phases are located at opposite ends of the column.

Each pair of inlet and outlet serves to deliver the heavier or the lighter phase used in the countercurrent partitioning process. The inside of the column is separated by transverse disk-like partitions 2 each with a hole at the center (FIG. 1(B)) into more than two loculi or compartments 3 (FIGS. 1(A) or 2).

The column is mounted on a support 6 which is adapted to impart a rotary motion to the column around its axis, at an appropriate angle from vertical. One way to make a duplicated opening at the end of the column is to use concentric double tubing as at 4. The inner tube is used for feeding and the outer annulus is used for discharge or vice versa.

One way of achieving a rotating seal for the concentric double tubing 4 connected to each end of the extraction column is illustrated in FIG. 5(A). Here a connecting fitting generally designated 17 is stationary and includes an interior stepped recess 18. The ends of the double tubing 4 project into the respective steps of the recess 18 and are sealed with the respective interior walls thereof by means of O-rings 14. A conduit 19 connects with the smaller of the stepped recesses for communication with the inner tube 12, while a conduit 20 connects with the larger of the recesses for communication with the outer of the concentric double tubing 13. Thus, liquid can be supplied selectively to the inner and outer tubing while the double tubing itself is free to rotate by means of the O-ring seals. The inner and outer tubes 12 and 13 can be maintained in spaced relation by means of internal spacers 15 as shown in FIG. 5(B). The spacers 15 are of annular segmental shape and curved to fit the internal and external peripheries of the inner and outer tubes respectively, leaving the remainder of the annular space between the two tubes open as at 16 for the passage of liquid therethrough as well as through the bore of the inner tube 12 itself.

The manner of achieving countercurrent flow of two phases inside the column is illustrated in the FIGS. 1(A) and 3. The heavier liquid phase is fed to the upper inlet A of column 1 and flows out from the lower outlet C of the other end of the column. The lighter liquid phase is fed to the lower inlet D and flows out from the upper outlet B. The two phases are fed at the same time and countercurrent flow occurs inside the column.

If a number of loculi are desired in the column, the disks are placed at the regular intervals along its length. The disks have a hole at the center which is usually punched but as far as the operation of the apparatus is not disturbed, the hole or more than one hole can be located at elsewhere than the center of the disk. There is no restriction on the shape of the hole or holes nor are special dimensions necessary. The size of the hole in the disk is determined considering the nature of the two phase system, the volume ratio of two phases in each loculi and the flow rate of the two phases. If the column is made by disks with large holes, the volume ratio becomes large and a higher flow rate results. The function of the loculi is to effect multistage extraction. Under optimal conditions, two to three loculi correspond to the extraction efficiency of one plate of an ordinary plate column. As a consequence, the larger the number of loculi in the column, the better the separation efficiency of the column. This means that for a given length of column, the disks must be located closer together for higher-extraction efficiency. One of the characteristics of this invention is the way of promoting partitioning of the solute between two liquid phases. In the usual extraction devices, the effective surface of partitioning is increased by dispersing one phase as small droplets into another phase since the surface area of a material increases with decreasing particle size. In this invention the effective surface for partitioning is increased by multiplying the effective length of wet wall in the column and by countercurrent flow of two liquid phases at the interface.

In any multi-phase solvent system, one of the phases will have a higher affinity for the material of the column wall than the other, and will preferentially wet the wall as a thin liquid film. By the rotation of the column, the solution which forms the liquid film on the column wall is thoroughly mixed with the rest of the solution which will form wet wall and a new liquid film is formed on the wall in every turn. Thus, the effective surface area for partitioning is greatly increased without forming a dispersion of small droplets of one phase into another and the partition equilibrium point can be controlled by adjusting the flow rate of the two liquid phases.

One way to impart rotatory motion to the column is by a connection to a motion of a motor. In this case, the column is either fixed on a rotating shaft, or the column itself is rotated as a shaft.

The way in which counterflow is achieved is illustrated in FIG. 3. For instance, the column 1 (having the structure shown in FIG. 1(A)) is first filled with the lighter phase liquid and arranged on a shaft inclined at an angle $\theta$ (see FIG. 3). Then, the heavier phase liquid is delivered to the column by inlet A. The heavier phase liquid displaces a certain volume of the lighter phase liquid and flows down the column and finally out through outlet C. While the heavier phase liquid is fed into the column, the lighter phase liquid is also delivered into the column by inlet D. The lighter phase liquid flows up the column and effluated out from outlet B. As a result, a countercurrent flow of the two liquid phases takes place in the column.

As described above, the efficiency of partitioning is promoted by rotation of the column while the countercurrent flow of two phases is taking place.

The exchange of the two phases within the column is caused by the difference of the density of two phases. The rate of exchange is increased when the holes in the partitions 2 are enlarged and vice versa.

The flow paths of the two liquid phases through the extraction apparatus of the invention are more clearly revealed in FIG. 6 which gives a more detailed illustration of the general apparatus of FIG. 3, employing prime designations for similar parts where appropriate. As can be seen from FIG. 6, the denser phase, identified by stippling, is introduced to the extraction column via an upper supply pump and conduit C' to the rotating seal fitting 27 communication with the inner tube of the double tubing 24, passing through the column 21 in generally the lower region thereof to eventually leave column 21 through the outer tube of the double tubing 24 at the lower end of the column for collection via conduit A' in collection receptacle 28. Conversely, the lighter phase is introduced via the lower supply pump through the conduit B' to the rotating seal fitting 27 to the inner tube of the double tubing 24 at the lower end of column 21, passing through the column in generally the upper region thereof to be discharged at the upper end of the column through the outer tube of the double tubing 24 at that end into conduit D' for collection in collection receptacle 29. Column 21 is mounted in offset or eccentric relationship to the support shaft 26 which is rotated by means of a gear 30 driven by any desired power source (not shown) as shown by the arrow $\omega$. At spaced points along its interior, column 21 includes generally dish-shaped partitions 22 having a central aperture therein. If needed, additional liquid of either phase can be introduced to the column through the injection port 31. As with the unit shown in FIG. 3, the column of FIG. 6 is arranged at an inclined angle $\theta$ relative to horizontal.

The volume ratio of the two phases in each loculi depends on the angle of the inclination of the column, the size of the hole of the disk, the flow rate of two phases and the difference in the densities of the two phases.

One major factor influencing the efficiency of the apparatus is the angle of inclination of the column. To achieve the purpose of this invention, it is necessary that both of the heavier and the lighter phases flow on the wall of the column during the rotation. If the column is held vertically, the flow of the solution by the rotation of the column around the axis of the column is minimized. The optimal angle for the efficient operation depends on the various factors, for instance, densities of the two phases, interfacial tension, the rate of rotation of the column and the flow rates of the solutions.

In the example of FIG. 3, the angle $\theta$ is adjusted to 15°. In general, larger angles of inclination are preferred when the difference in density is present between the two phases, or higher flow rates are desired for operation.

This invention includes a modified system of extraction which is constituted by the combination of a column described above and a second column of the similar type which has only one pair of inlet and outlet as shown in FIG. 2. In this modification, which is illustrated in FIG. 4, one of the two outlets of the first column is connected to the inlet of the second column, and the outlet of the second column is connected to the inlet at the other end of the first column to recycle one of the two phases of the first column. Both of the columns are fixed on a common shaft to rotate around the axis of the columns which is held at a definite angle from the vertical. The mechanical rotational devices are the same as in the previous apparatus.

The modification of FIG. 4 can be used to back-extract the solute extracted in the first column into another phase contained in the second column.

The second column, having the structure shown in FIG. 2, for back-extraction is connected by a tubing 8 to the first column 1 having the structure shown in FIG. 1(A), and both columns are fixed on a rotating shaft 6. The lighter liquid flows out from the top of column 1 and is delivered to the bottom of column 7 through tubing 8. Column 7 partially contains a heavier liquid phase for back-extraction. The solute in the liquid from column 1 is back-extracted in column 7 and concentrated into the additional phase in column 7 through a partitioning mechanism similar in principle to the previous apparatus.

The solution flowing out from column 7 is free from the solute and used again for extraction in the column 1. Consequently, the solute to be extracted is accumulated in the stationary additional phase in column 7.

In summary, the apparatus provided by this invention offers a highly efficient method of extraction, isolation and purification of various compounds or ions by countercurrent partitioning mechanism between two immiscible phases, one containing the substance to be extracted. The major advantages obtained by this invention are:

1. Fragile and uniquely shaped distribution tubes are not required.

2. The operation can be accomplished with simple and trouble free apparatus.

3. No stirring devices are required, permitting the structure of the apparatus to be extensively simplified.

4. Dispersion of either liquid into droplets is not involved in the operation and the possibility of emulsification is minimized so that the space and the time required to separate dispersed phases are eliminated and the apparatus can be made smaller in size and the time of operation can be reduced.

5. All of the space in the apparatus is filled with liquid phases and oxidation of unstable compounds by atmospheric oxygen is avoided.

6. Less power is required for operation than centrifugal type extractors and little danger is expected during operation.

7. The extracting solvent can be supplied continuously without any difficulty, and continuous operation is, therefore, quite convenient.

8. The interfacial area between the two phases in each loculi increases as a linear function of the diameter of the column; hence, efficiency is not reduced significantly with columns of larger diameter.

9. The construction of the apparatus is easy and inexpensive. As described above, the apparatus provided by this invention can be operated continuously by supplying extracting solvent at appropriate rate. Suitable extracting solvents are chelating agents, alkylesters of phosphoric acid or liquid ion exchangers like alkylamines of high molecular weight dissolved in water immiscible solvent, among others.

The present apparatus can be used to efficiently extract heavy metal ions or valuable metal ions from dilute solutions, for example, solutions produced in various kinds of industries or environmental water. Such heavy metal ions include ions of mercury, cadmium, lead, zinc and so forth, which are toxic to animals including human beings.

The apparatus is also highly efficient for both the isolation and removal of ions of radioactive isotopes.

The apparatus can also be applied to any isolation or extraction process which is based on the difference of partition coefficients of a compound relative to the liquid phases. Because partition coefficients are known to be relatively unaffected by the presence of other solutes in the solution, the apparatus is especially efficient to extract minor components from the solution which contains excessive amounts of other compounds.

The apparatus also is advantageous for extracting compounds which are not stable to atmospheric oxygen or for extracting solutes from solutions which tend to foam when stirred in the atmosphere, for example, solutions of biological sources, protein solutions, solutions containing detergents and so forth.

The apparatus is also effectively applied to the extraction, isolation and purification of antibiotics, amino acids and peptides, and other biologically active substances. Furthermore, since a manyfold increase in concentration can be done during the extraction process, monitoring of minute materials in dilute solutions can be made by measuring the effluent of the extraction continuously with appropriate detectors, for example, by measuring absorbance by a spectrophotometer. Examples of practical application of this method are the monitoring of toxic materials in the environment, i.e., metal ions, organic mercurials, insecticides, herbicides and so forth.

Examples of the applications of this invention are illustrated in the following two cases. However, these examples are only for illustrating the purpose and usefulness of the invention and the scope of the application of this invention is not intended to be restricted by these examples.

EXAMPLE 1

The loculi in the column in FIG. 1 are made by placing polyethylene disks at every 15 mm intervals in a glass column of 750 mm length and 30 mm internal diameter. Each disk has a hole of 10 mm diameter at its center. At both ends of the column, silicone rubber stoppers with concentric double tubing are tightly fitted. The solution to be extracted is made by dissolving cupric ion in deionized water at the concentration of 30 p.p.m. The extracting solution, which is the lighter phase, is made by dissolving tenoyltrifluoroacetone (TTA) in methyl isobutyl ketone (MIBK) at the concentration of 0.2M.

First the column is filled with the extracting solution and fixed on a shaft held at the angle of 15° (see FIG. 3). The column is then rotated at the rate of 100 r.p.m. While the column is rotating, the solution to be extracted is introduced to inlet A and the extracting solution is introduced to inlet D. The rates of extraction of cupric ion from aqueous solution are determined at various flow rates for this solution; while the flow rate of extracting solution is held fixed at 3 ml/min.

EXAMPLE 2

The loculi 3 of a second column (as in FIG. 2) used for back-extraction are made by placing polyethylene disks 2 at every 15 mm intervals in the glass column of 750 mm length and 19 mm internal diameter. Each disk has a hole of 2 mm diameter at its center. The column 7 is filled with 2N HCl and fixed on a shaft 6 as in FIG. 4. The other column 1 is set on the same shaft in the same way as in Example 1.

The outlet at the top of column 1 is connected to the inlet at the bottom of column 7 by Teflon tubing 8 as in FIG. 4 so that the extract of column 1 (FIG. 4) eluted from the top outlet is delivered to the bottom inlet of column 7. The extract from column 1 displaces a part of hydrochloric acid in column 7 and flows upward.

When the flow rate is fixed at 3 ml/min and the speed of rotation is 100 r.p.m., cupric ion extracted from the aqueous solution in column 1 is back-extracted and concentrated into hydrochloric acid in column 7.

Cupric ions cannot be detected colorimetrically with TTA in the MIBK solution effluent from the top of column 7. The raffinate of column 7 which is free from cupric ion is introduced into the bottle 9 where the pH and the concentration of TTA is adjusted by adding appropriate reagents from dropping funnel 10 to make the solution fresh as the extracting solution for column 1.

The same MIBK solution of TTA is in this way recycled by pump 11 and used repeatedly.

Table

| sample solution flow rate ml/min | Cu in raffinate ppm | per cent extraction |
| --- | --- | --- |
| 4.7 | 0.02 | 99.93 |
| 30 | 0.30 | 99.00 |
| 50 | 0.42 | 98.60 |

Cu concentration in sample solution is 30 ppm.

What is claimed is:

1. A liquid-liquid extraction apparatus comprising an elongated extraction column arranged at an angle to the horizontal, said column being divided by partitions into a plurality of intercommunicating compartments, an inlet and outlet at each end of said column, means for introducing a less dense liquid into the lower inlet of said column for discharge through said upper outlet and means for introducing a more dense liquid into said upper inlet for discharge through said lower outlet, said liquids being immiscible with one of them having dissolved therein the solute to be extracted by the other, and means for imparting bodily rotation to said column about an axis parallel and eccentric to said inclined column axis, said inlet and outlet at the same column end being arranged concentrically and including extensions which are eccentric to said column end and coaxial with said axis of rotation.

2. The apparatus as in claim 1, wherein said partitions extend generally transversely of the column length and have apertures therein for communicating therebetween.

3. The apparatus as in claim 1, including a second column arranged at a similar angle to said first column and mounted for bodily rotation in common therewith about said common eccentric axis, said second column having at its opposite ends a single inlet and outlet connected in circuit to one pair of the inlet and outlet in said first column whereby one of said liquids can be recycled.

4. The apparatus as in claim 3, wherein said second column contains a third liquid having a different density from the liquid being recycled for back-extracting the solute from said recycled liquid.

5. A liquid-liquid extraction method comprising the steps of passing two immiscible liquids of differing densities, one containing a solute to be extracted by the other, in countercurrent gravity-impelled flow through an elongated contacting zone inclined in its lengthwise direction from the horizontal, said zone having plural contact surfaces projecting therein at an angle to its length while subjecting said zone to bodily rotation about its length about an axis parallel and eccentric to said direction of inclination.

6. The method of claim 5, wherein said extracting liquid is back-extracted by circulating the same through a second contacting zone similar to the first such zone extending parallel to and rotated bodily in common with said first zone, said second zone containing a third liquid immiscible with said extracting liquid and of different density and having at its opposite ends an inlet and outlet for the extracting liquid from the first zone, the location of the inlet and outlet being such in relation to the respective liquid densities as to produce gravity flow of the extracting liquid while the back-extracting liquid remains confined in said second zone.

* * * * *

UNITED STATES PATENT OFFICE
CERTIFICATE OF CORRECTION

Patent No. 4,111,660      Dated September 5, 1978

Inventor(s) Yozo Kabasawa et al

It is certified that error appears in the above-identified patent and that said Letters Patent are hereby corrected as shown below:

In the Heading:

The following should be inserted:

-- [30]    Foreign Application Priority Data

July 16, 1975 [JP]  Japan ......... 50-86228 --.

Signed and Sealed this

Third Day of April 1979

[SEAL]

Attest:

RUTH C. MASON
Attesting Officer

DONALD W. BANNER
Commissioner of Patents and Trademarks